United States Patent [19]

Fujisawa et al.

[11] Patent Number: 5,021,989
[45] Date of Patent: Jun. 4, 1991

[54] DOCUMENT BROWSING APPARATUS WITH CONCURRENT PROCESSING AND RETRIEVEL

[75] Inventors: Hiromichi Fujisawa, Tokorozawa; Atsushi Hatakeyama, Kokubunji; Masaaki Fujinawa, Tokyo; Eiichi Hadano, Hachioji, all of Japan

[73] Assignee: Hitachi, Ltd., Tokyo, Japan

[21] Appl. No.: 593,260

[22] Filed: Oct. 1, 1990

Related U.S. Application Data

[63] Continuation of Ser. No. 42,703, Apr. 27, 1987, abandoned.

[30] Foreign Application Priority Data

Apr. 28, 1986 [JP] Japan .................................. 61-96706
Sep. 10, 1986 [JP] Japan .................................. 61-211594

[51] Int. Cl.$^5$ ............................................. G06F 3/153
[52] U.S. Cl. .................................. 364/900; 364/927.2; 364/943; 364/948.3
[58] Field of Search ............................... 364/200, 900

[56] References Cited

U.S. PATENT DOCUMENTS

| | | | |
|---|---|---|---|
| 3,949,375 | 4/1976 | Ciano | 364/200 |
| 4,159,417 | 6/1979 | Rubincam | 340/706 |
| 4,513,390 | 4/1985 | Walter et al. | 364/900 |
| 4,571,700 | 2/1986 | Emry, Jr. et al. | 364/900 |
| 4,734,856 | 3/1988 | Davis | 364/300 |
| 4,742,467 | 5/1988 | Messerich et al. | 364/200 |
| 4,755,809 | 7/1988 | Ikegami et al. | 340/709 |

Primary Examiner—Lawrence E. Anderson
Attorney, Agent, or Firm—Antonelli, Terry, Stout & Kraus

[57] ABSTRACT

An apparatus for document browsing, specifically for document retrieval systems. The browsing apparatus enables users to see multiple document pages on the same screen at the same time in a first mode and to see a bundle of pages on a screen in a second mode. The images shown on the screen are produced internally according to the user's commands. The pages may be flipped in either direction and selected pages may be marked for later printing instructions.

12 Claims, 17 Drawing Sheets

| DID | CLASS | TITLE | AU | KW | DATE |
|---|---|---|---|---|---|
| | | ⋮ | | | |
| 2001 | 101 | "FILING SYSTEM..." | SMITH | DOCUMENT △RETRIEVAL | 860815 |
| | | ⋮ | | | |

FIG. 20

| DID | PN | C | PSYA | RL | SDEN | SIZE | CODE |
|---|---|---|---|---|---|---|---|
| ⋮ | | | | | | | |
| 2001 | 1 | 0 | 28011 | 5 | 16 | A4 | MMR |
| 2001 | 1 | 1 | 10020 | 1 | 8 | A6 | MMR |
| 2001 | 2 | 0 | 28016 | 4 | 16 | A4 | MMR |
| ⋮ | | | | | | | |

| DID | A1 | A2 | A3 | A4 | A5 | A6 | A7 | A8 |
|---|---|---|---|---|---|---|---|---|
| ⋮ | | | | | | | | |
| 2001 | 1 | 3 | 15 | 12 | 0 | 0 | 0 | 0 |
| ⋮ | | | | | | | | |

403

| MODE |
|---|
| PAC |
| RGN |
| R1 |
| R2 |
| R3 |
| R4 |
| R1P |
| R2P |
| R3P |
| R4P |
| NMX |
| MK(1) |
| MK(2) |
| ⋮ |
| MK(NMK) |
| ⋮ |
| NRD |
| RD(1) |
| RD(2) |
| ⋮ |
| RD(NRD) |
| ⋮ |

DOCUMENT BROWSING APPARATUS WITH CONCURRENT PROCESSING AND RETRIEVEL

This application is a continuation of application Ser. No. 042,703, filed on Apr. 27, 1987, now abandoned.

BACKGROUND OF THE INVENTION

The present invention relates to an apparatus for sequentially displaying a plurality of pages, and in particular, to an image display apparatus suitable for the user to search for a desired image by visually confirming each image while sequentially browsing through a great amount of images.

In the prior art technology, as described in JP-A-58-84365, the images are only displayed in an overlapped fashion with a slight difference therebetween to confirm the number of the classified images. Considerations have not been given to the points that the overlapped display is used to search for a plurality of images and to flip pages containing images in either directions, namely, in the forward and backward directions so as to display the pages. A retrieval operation in which the user visually confirms each page to search for a desired image while browsing through a great amount of images requires a bidirectional sequential image display quite easily comprehensible for the operator in which the retrieved images are displayed in the forward flipping order and/or in the backward flipping order.

Moreover, in an image retrieval, each page of image is required to be read from a mass storage device such as an optical disk so as to be displayed on a display apparatus. A certain period of time (1–2 seconds) is necessary to read a desired image from a mass storage device such as an optical disk. In order to instantaneously (0.1 second) display the page in response to an indication from the operator like in the case where the reader flips pages of a book, the images from the optical disk are required to be temporarily stored in a high-speed buffer memory such as a semiconductor memory.

Furthermore, in the image retrieval operation, it is also important to have information indicating the current number of image pages that have been loaded from the optical disk to the high-speed buffer memory such as a semiconductor memory.

Therefore, this enables to provide the operator with information that the image to be found can be instantaneously displayed or a certain time is required before the image is displayed, thereby reducing the psychological uneasiness of the operator. As described above, according to the prior art technology, the retrieval of a plurality of images has not been sufficiently considered.

SUMMARY OF THE INVENTION

It is therefore an object of the present invention to provide a method suitable for an operation to search for a desired image from a plurality of pages of images in which the desired image can be instantaneously and correctly identified according to an image in the mind of the operator who knows the approximate location of the page in a document in advance.

Another object of the present invention is to provide a display method enabling the operator who may be only visually checking the displayed screen to judge whether the pages are flipped or turned in the forward direction or backward direction.

Still another object of the present invention is to provide a display method enabling the operator to judge the amount of image pages that have been transferred from a mass storage device such as an optical disk into a high-speed buffer memory such as a semiconductor memory. Moreover, even while a search for an image is being carried out through a visual inspection of images in the high-speed memory, other images are transferred from the mass storage device into the high-speed buffer in concurrence with the search operation, thereby increasing the retrieval efficiency.

These objects can be achieved by changing the display mode depending upon the direction of page flipping when a plurality of images are sequentially displayed. Moreover, the amount of the page images loaded into the high-speed buffer memory can be known by sequentially displaying a portion of the image when it is transferred from the mass storage device into the high-speed buffer memory. Here, it is important that the plural images are displayed in a 3-dimensional fashion. This method makes the retrieved images displayed in the manner similar to those of a book, which prevents erroneous recognition of the position of a page currently looking at, the direction of the page flipping, and the contents of the image.

The concurrent operations of the visual search for an image with high speed page flipping and the transfer of images to the high-speed buffer load to a reduction of the wait time necessary to display the next image retrieved and hence the psychological burden on the operator is minimized.

Next, the basic method for implementing the functions above will be described with reference to a diagram.

FIG. 1 is a schematic diagram illustrating a display screen in the display mode according to the present invention. A display screen 101 includes a start point marker 102 indicating the position of the first image retrieved, an image 103 currently displayed, and a partial image 104 indicating a portion of the image transferred from a mass storage device into a high-speed buffer memory allowing an instantaneous display of an image.

The display screen 101 of FIG. 1 shows a display state in which several pages have been flipped in the forward direction beginning from the first image page.

The display process will be concretely described with reference to FIG. 2. When the retrieval is started, a start point marker 112 is first displayed. Next, when the first image retrieved is transferred from the mass storage device and is stored in the high-speed buffer so as to be ready for the display, the image 113 is immediately displayed. The display point 113a of the first image 113 is at a position 112a indicated by the start point marker 112, which is brought into contact with the image 113.

The display point of the first image will be described more precisely. A point of the start marker 112 is assumed to be a base point. For example, in the example of FIG. 2, a point 112a is assumed as the base point. The origin of the image 113 is set to a point 113a at the lower-left corner of the image.

The first image 113 is displayed at a point where the origin of the image matches with the base point.

The second image is displayed when the second image is transferred from the mass storage device into the high-speed buffer memory at a point where the origin of the second image is apart from the base point 112a by $\Delta x$ and $\Delta y$ in the vertical and horizontal directions, respectively ($\Delta x$, $\Delta y > 0$). However, all the screen of the second image is not displayed, i.e. only the portion 114 of the second image not overlapping with the first image is displayed. Each time an image from the mass storage device is stored in the high-speed buffer memory, only the partial image 114' is displayed with the origin of the image being shifted by Δx and Δy.

The operation of the page flipping in the forward direction will be described with reference to FIG. 3.

When effecting the page turning operation in the forward direction, the entire area 123 of the first image is painted with the color identical to that of the background (white in an ordinary case) and then the second image 123' is displayed. In this operation, the second image 123' is not entirely displayed, namely, only the remaining portion of an image 124, displayed when the image from the mass storage device is stored in the high-speed buffer memory, may be displayed.

In addition, the entire area of the first image need not be necessarily painted with a background color, namely, only the area of the first image not overlapping with the second image may be displayed by use of the background color.

The page flipping operation in the backward direction will be described with reference to FIG. 4. Assume that the third image 133 is currently being displayed. When executing the page flipping operation in the backward direction, it is only necessary to simply display the second image 133' in the area where the second area was displayed before.

FIGS. 5-6 show display screens displayed under conditions of Δx=0, Δy>0 and Δx>0, Δy=0, respectively.

Here, the start point marker may be set to an upper-right corner of the display screen with the conditions of Δx<0 and Δy<0; moreover, like in the cases of FIGS. 2-3, conditions may be set as Δx=0, Δy<0 or Δx<0, Δy=0.

A variation of the basic principle will be described with reference to FIG. 1.

For an image of an ordinary document, the periphery of the image is white in many cases. Consequently, when a black frame is applied to the profile of the image of the document, the display image becomes further comprehensible. In this operation, in place of a display of the partial image 104 not overlapping with the first image, it may only be necessary to display a portion of the black frame not overlapped.

Furthermore, in the page turning operation in the forward direction, in place of an operation to draw by use of the color of the background only an area of the first image not overlapping with the area of the second image, only a portion of the first black frame not overlapping with the area of the second image may be drawn by use of the background color.

The image 103 to be displayed may include, in addition, the image of a photo, a graphic image, an image representing a document generated by a word processor or the like by use of character codes.

Still another object of the present invention is to provide a method enabling the operator to instantaneously judge whether or not each document retrieved which consists of a plurality of pages is the desired document. To this end, the document is required to be displayed in a manner similar to that applied to the handling of a document written in paper. Particularly, a browsing function is required to browse various locations of the document.

Moreover, still another object of the present invention is to provide a function to mark browsed pages for the usage thereof in future, thereby enabling to browse or traverse through a document without imposing any psychological load on the operator.

In summary, the object of the present invention is to provide a system which enables the user to handle with a sense of physical existence the document electronically stored, and which can be quite easily operated.

To achieve the object, according to the present invention, there is provided a function which displays a plurality of portions of each document in a screen of a terminal based on information about a logical structure of the document and a function which effects a page flipping operation in an arbitrary direction for each portion independently of each other. Moreover, there is provided a function which displays an enlarged image of each portion to be inspected in more detail.

Furthermore, pages of documents are displayed in the screen like the physical pages of a document, which also provides the operator with a sense of turning pages at a high speed. The pages can be turned in the forward or backward direction and there is also provided a function to display an enlarged image of a portion according to an instruction. Moreover, a function to mark a page of interest is available, namely, according to an indication from the user, the document page currently being displayed is internally and externally marked.

That is, a mark is assigned as data to the page in the system for the future use, and at the same time, a mark is graphically added to the page in the screen. A plurality positions of each document may be marked, and naturally, the mark can be deleted.

In addition, there is provided a function to use the mark information thus added. More concretely, first, an automatic page flipping function is supported to automatically turn pages up to the next marked page. In response to an indication from the user, the document images in the screen are automatically flipped up to the next marked page. The user can also indicate the page turning direction i.e. the forward or backward direction.

As the second function, it is possible to print only the marked page.

The third function enables to display a plurality of marked pages on the same screen.

Through implementation of these functions, the object described above ca be accomplished.

Next, a description will be given of the principle and operation of the display modes according to the present invention.

FIG. 7 is a schematic diagram showing a simultaneous display of a plurality of pages of a document. A display content 711 is an example displaying four portions of a document e.g. a patent specification. In this example, areas 721-724 respectively display "Claims", a portion of the text, a diagram, and "Brief Description of the Drawings". The partition of these four parts are a concrete example of the logical structure of a document.

According to the system of the present invention, there is provided an independent page flipping function for each page in addition to the display configuration. A display content 712 is a state obtained by turning the page of the area 722. The user can execute this function by indicating an area and a flipping direction. Moreover, as shown in the display content 713, there is also provided a function to display an enlarged image of an arbitrary area and a function to restore the screen to the simultaneous display screen.

Incidentally, arrow marks 731 and 732 indicate transitions between display modes and correspond to the functions of the display system according to the present invention. Namely, the arrow marks 731 and 732 indicate the page flipping function for each area and the enlarged image display function.

FIG. 8 is a diagram showing document images in a 3-dimensional fashion for explaining the high-speed page flipping function which turns the image pages like the pages of a book. According to an indication from the user, the display mode can be changed from the display 711 to the display 715. In the display mode 715, the document pages being displayed can be turned in the forward or backward direction at a high speed according to an indication from the user. The display 716 shows a screen obtained as a result of the page flipping operation in the forward direction. Furthermore, at an arbitrary point of time, a page image being displayed can be enlarged and displayed as shown in the display 717.

Next, the mark function will be described with reference to FIG. 9. A display content 941 is a display obtained when the user issues a mark indication while all pages are being displayed. A black rectangular mark 925 indicates that the pertinent page has been marked. A display 942 shows a screen in which the mark is assigned again after the page is turned in the forward direction. As shown in this diagram, the mark can be assigned to the page currently being displayed. In a display 943, there is illustrated a display mode in which a desired position is marked as described above and the pages are flipped in the backward direction until the first page appears at the top of the pages. As described above, a plurality of marks can be assigned at arbitrary positions.

Moreover, as shown in a display 944 of FIG. 9, the pages thus marked can be simultaneously displayed. In this operation, N pages (N is 4 in the example in FIG. 9) beginning from the top of the marked page are displayed; furthermore, the N pages to be displayed may be shifted. For example, N pages of image may be simultaneously displayed beginning from the second marked page, the third marked page, or M-th marked page.

The system of the present invention supports a function to automatically turn pages so as to display a marked page. The user can instruct to automatically turn pages in the forward or backward direction from the page currently displayed to the next marked page. FIG. 10 is a diagram illustrating the intermediate screens of an operation to turn pages in the forward direction (from a smaller page number to a greater page number). If the portion to be subjected to the page flipping is limited only to an upper portion of each page (height $=\Delta H$), a higher-speed flipping operation can be achieved. FIG. 11 shows an intermediate screen when the pages are turned in the backward direction (returning direction). For the operations of FIGS. 10–11, the display contents when the flipping operation is completed are as illustrated in the display 716 and the display 715 of FIG. 8, respectively.

A function to print only the marked pages is effected by referencing the marked page information internally recorded.

BRIEF DESCRIPTION OF THE DRAWINGS

The present invention will be apparent from the following detailed description taken in conjunction with the accompanying drawings in which:

FIG. 20 is a schematic diagram depicting the table format of data used to manage document images;

FIG. 21 is a schematic diagram showing the format of a table for storing the page property;

DESCRIPTION OF THE PREFERRED EMBODIMENTS

A description will be given in detail of an embodiment according to the present invention.

Figure 12:
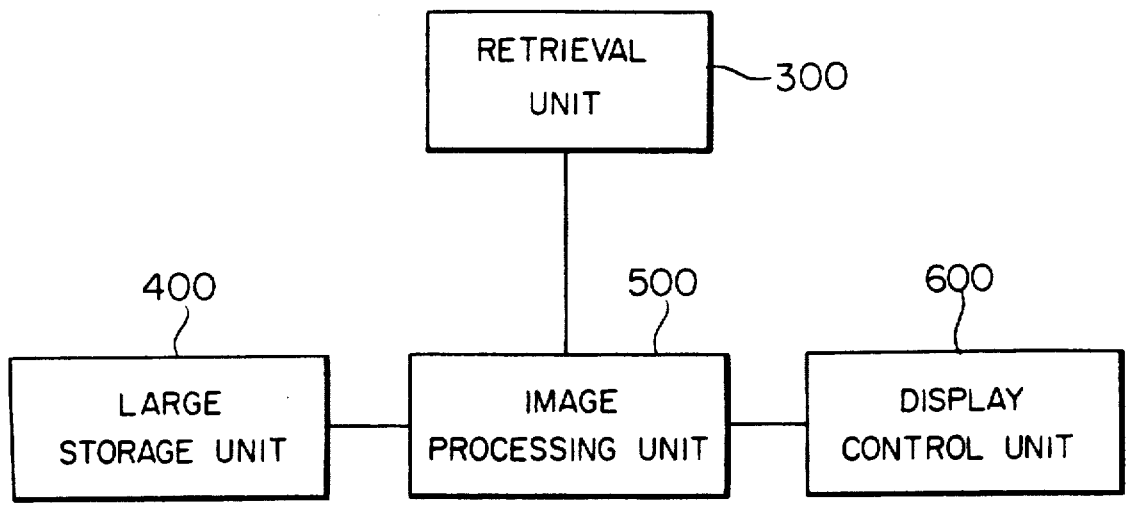
FIG. 12 is a block diagram showing the overall configuration of an embodiment of the present invention.

FIG. 12 is a block diagram showing the configuration of an embodiment of the image display system for explaining the display apparatus of the present invention. The system primarily includes a retrieval unit 300, a large storage unit 400, an image processing unit 500, and a display control unit 600.

Figure 13:
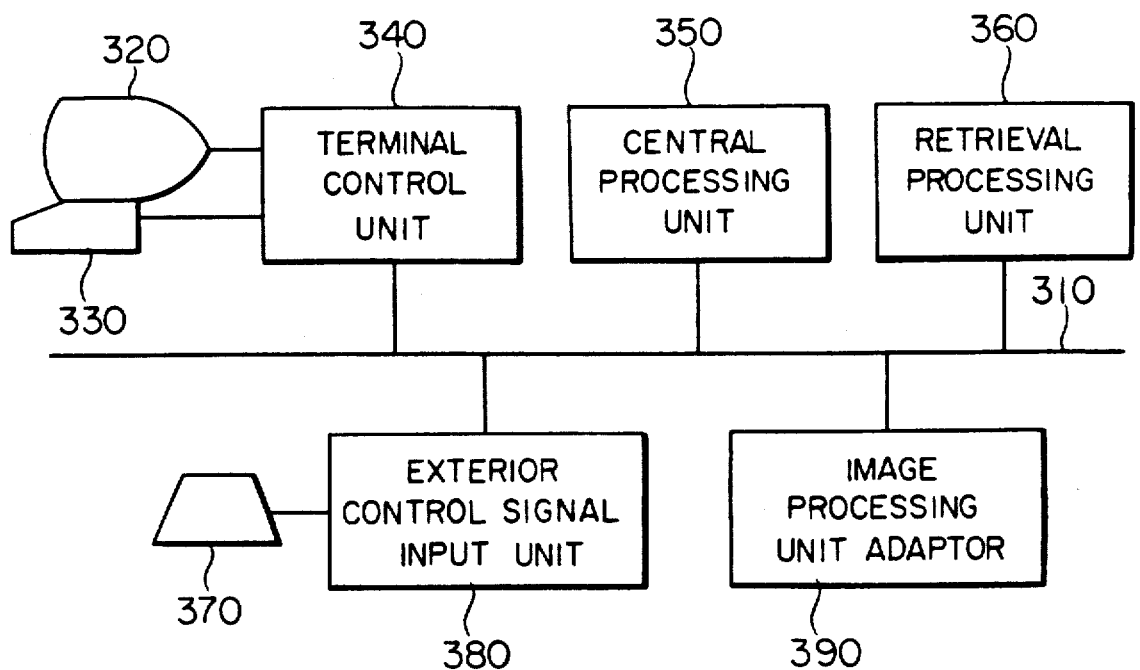
FIG. 13 is a block diagram illustrating a retrieval unit configuration of an embodiment of the present invention.

Next, the configuration of each unit will be described in detail. First, as shown in FIG. 13, the retrieval unit 300 comprises a control bus 310, a retrieval guide display screen 320, a keyboard 330, a terminal control unit 340, a central processing unit 350, a retrieval processing unit 360, an exterior control signal input device 370, an exterior control signal input unit 380, and an image processing unit adaptor 390.

Figure 14:
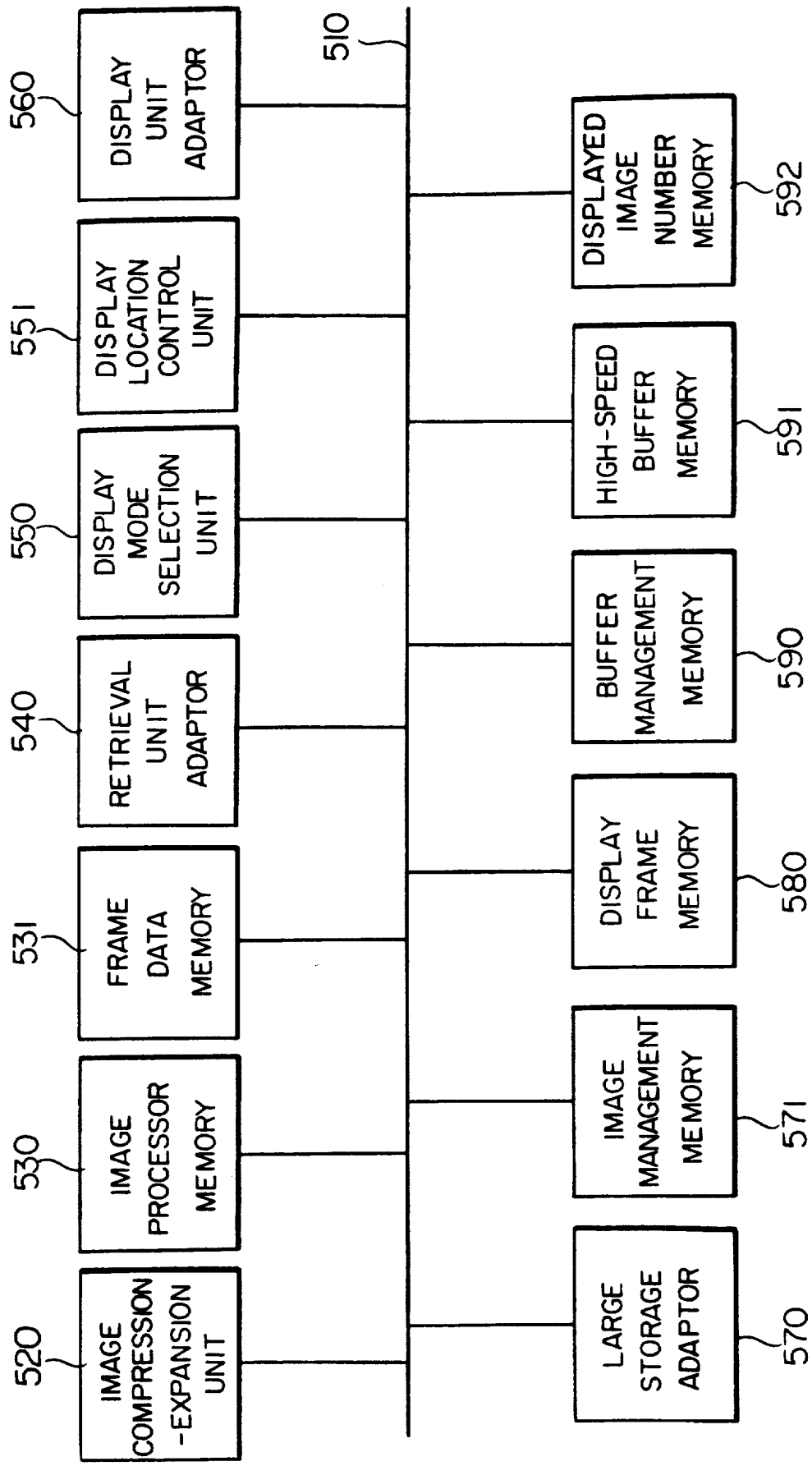
FIG. 14 is a block diagram depicting the configuration of an image processing unit of the embodiment according to the present invention.

Furthermore, the image processing unit 500 includes as shown in FIG. 14 an image bus 510, an image compression-expansion unit 520, an image processor memory 530, a frame data memory 531, a retrieval unit adaptor 540, a display mode selection unit 550, a display location control unit 551, a display unit adaptor 560, a large storage adaptor 570, an image management memory 571, a display frame memory 580, a buffer management memory 590, a high-speed buffer memory 591, and a display image number memory 592.

Figure 15:
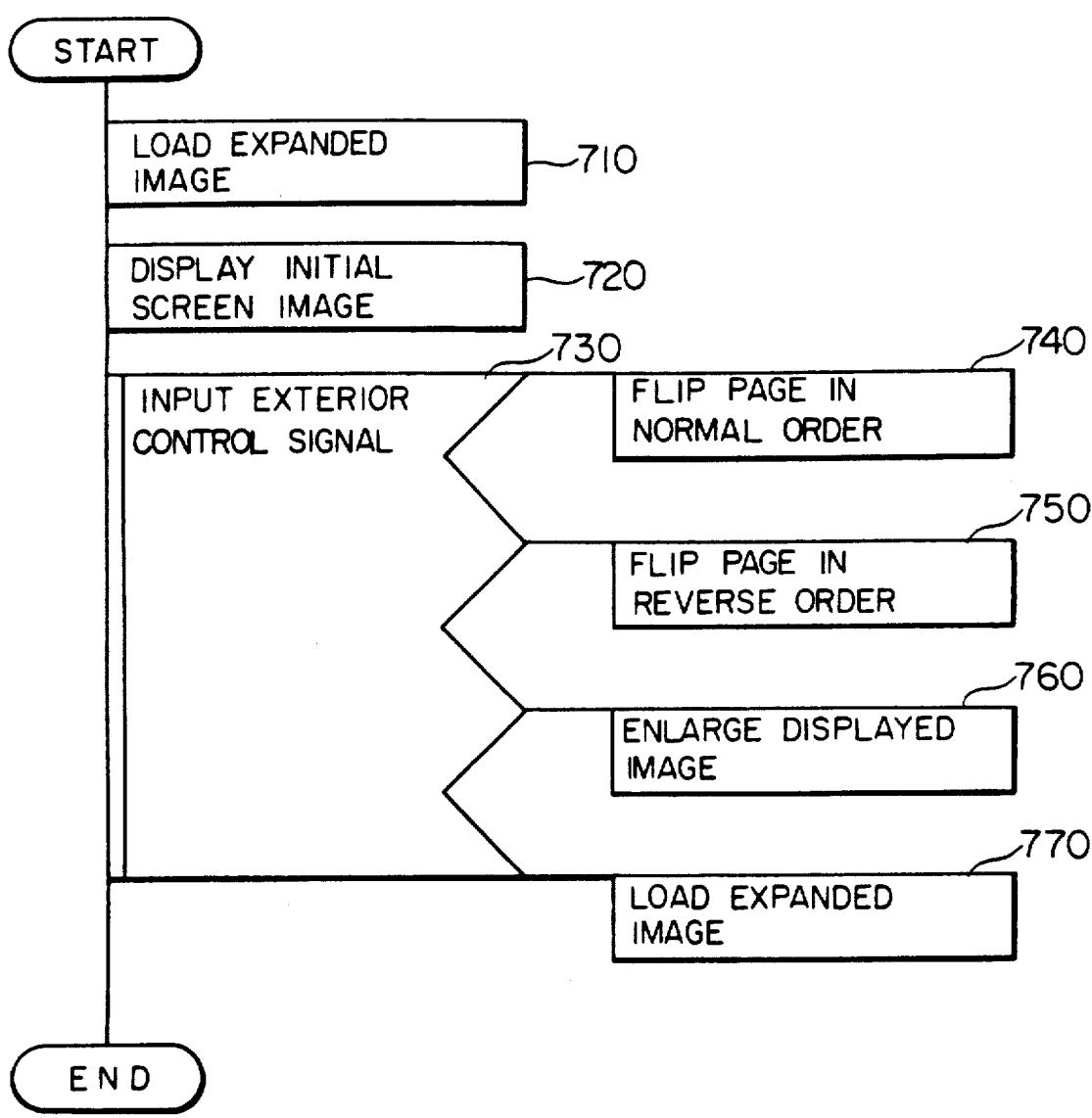
FIG. 15 is a processing flowchart of the embodiment of the present invention.

The overall processing flow will be described with reference to FIG. 15. The overall processing flow includes an expanded image load 710 to load information about a plurality of pages of a document retrieved from the retrieval unit 300 to the image processing unit 500, an initial screen image display 720 to effect image processing and image display of the start point marker in the initial screen, an exterior control signal input 730 to achieve an input of information for controlling the page flipping processing and the like, a forward page flipping 740 to turn document images in the forward or normal direction, a backward page flipping 750 to turn document images in the backward or reverse direction, a display image enlarge operation 760 to display enlarged document image and to flip the enlarged image, and an expanded image load 770 to load a plurality of document images retrieved into the high-speed buffer memory 591. The forward page flipping 740, the backward page flipping, the display image enlarge operation 760, and the expanded image load 770 are designed to be processed in parallel.

Next, these processing will be described in detail.

The expanded image load 710 of FIG. 15 will be described with reference to FIGS. 13, 14, 16, and 17. First, according to the content displayed in the retrieval guide display screen 320 of FIG. 13, an image to be retrieved is selected from the keyboard 330. In this operation, a plurality of pages of images are retrieved in many cases. The specified retrieval condition is sent to the retrieval processing unit 360 to search for the pertinent image number. The central processing unit 350 delivers via the image processing unit adaptor 390 to the image management memory 571 an instruction to extract the image having the pertinent image registration number.

Figure 16:
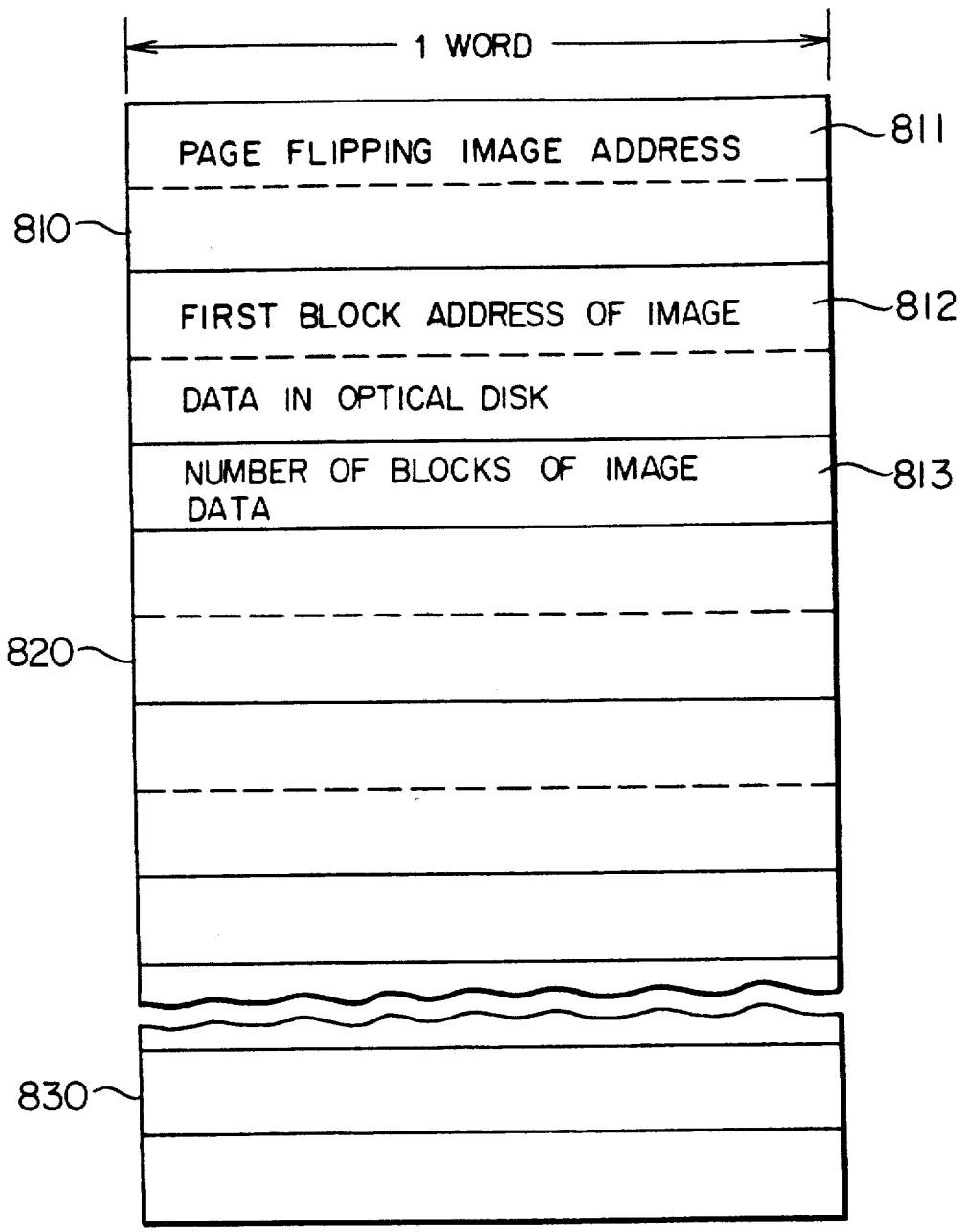
FIG. 16 is a schematic diagram showing the structure of a high-speed buffer management table of the embodiment according to the present invention.

FIG. 16 shows the data layout in the buffer management memory 590. The buffer management memory 590 includes information 810 for each page comprising a page flipping image address 811 indicating the first address of the image data in the high-speed buffer memory 591, a first block address 812 of image data in optical disk indicating the first block of image data in the optical disk, and a number of blocks of the image data 810 indicating the size of the image data; namely, this memory 590 contains the information items 810 as many as there exist image pages. Memory blocks 820 and 830 are for the second page and the third page, respectively.

Figure 17:
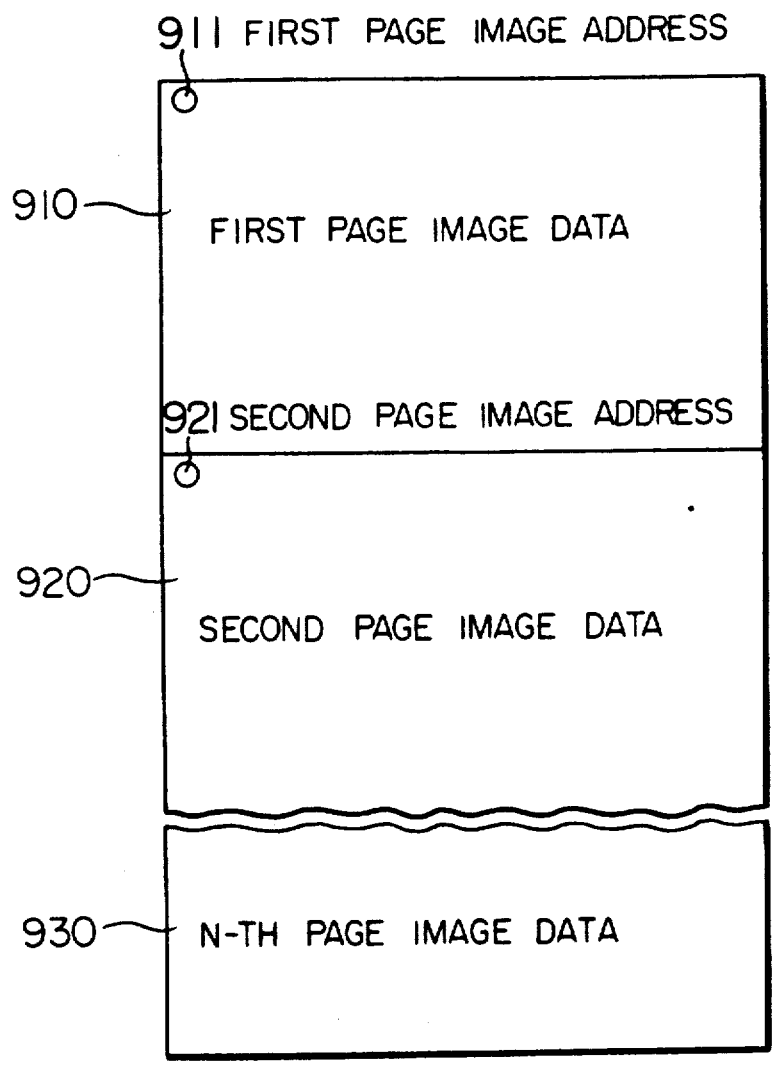
FIG. 17 is a schematic diagram depicting the memory layout of the high-speed memory of the embodiment according to the present invention.

FIG. 17 shows the data layout in the high-speed buffer memory 591. The buffer memory 591 is used to store image data to be displayed. The first addresses of the respective images are denoted as a 1st page image address 911, a 2nd page image address 921, and so on. On receiving the instruction, the image management memory 571 transfers to the buffer management memory 590 pairs of a first block address of image data in optical disk 812 and a number of blocks of image data as many as there are the pages of document retrieved. At the same time, the 1st page image address 911 of FIG. 17 is set to the page flipping image address 811.

The initial image display will be described with reference to FIGS. 1, 14, 16, and 17. As shown in FIG. 14, like the generation and storage of data as components in the image processor memory 530 according to the method of document browsing of the present invention, the frames to be applied to a plurality of expanded images are generated and stored in the frame data memory 531 and are transferred to the high-speed buffer memory. Next, to input a page of image as the initial image, an instruction associated with data of the page 1, specified by the page flipping image address 811, the first block address of image data in optical disk 812 and the number of blocks of image data 813 of FIG. 16, is issued and is then sent from the buffer management memory 590 to the image compression-expansion unit 520. On receiving the instruction, the image compression-expansion unit 520 reads out the compressed image data via the large storage adaptor 570, effects an expansion processing on the image data so as to change the size thereof to a quarter of the original image not compressed, and transfers the image data to the high-speed buffer memory 591 in the order of data shown in FIG. 17. Here, the size of the original image is assumed to be identical to that of the display screen 101. At the same time, the 2nd page image address 921 of FIG. 17 is outputted to the 2nd page information 820 of FIG. 16 of the buffer management memory 590. And then, data containing 0's is transferred from the image processor memory 530 via the display unit adaptor 560 so as to clear the image display apparatus. Next, the image of the 1st page is selected by use of the display mode selection unit 550 and the instruction is outputted to the buffer management memory 590, the high-speed buffer memory 591, and the display image number memory 592. The 1st page image from the high-speed buffer memory 591 is transferred to a position of the image display apparatus determined by the display location control unit 551 based on the information from the display image number memory 592. At the same time, the start point marker 102 is transferred from the image processor memory 530 to the image display apparatus, thereby displaying the initial image including the start point marker and the 1st page image 103 of FIG. 1.

Next, the exterior control signal input of FIG. 15 will be described with reference to FIGS. 13–15. As shown in FIG. 13, this processing is executed to input information controlling the page flipping processing, namely, the control information items such as the speed, direction, and enlargement for the page flipping operation are transmitted from the exterior control signal input device 370 to the display mode selection unit 550 via the exterior control signal input unit 380, and the image processing unit adaptor 390. Based on the information, the display mode selection unit 550 achieves a processing selection for the forward page flipping 740, the backward page flipping 750, the display image enlargement 760, and the expanded image load 770 and specifies the processing objective page.

Figure 1:
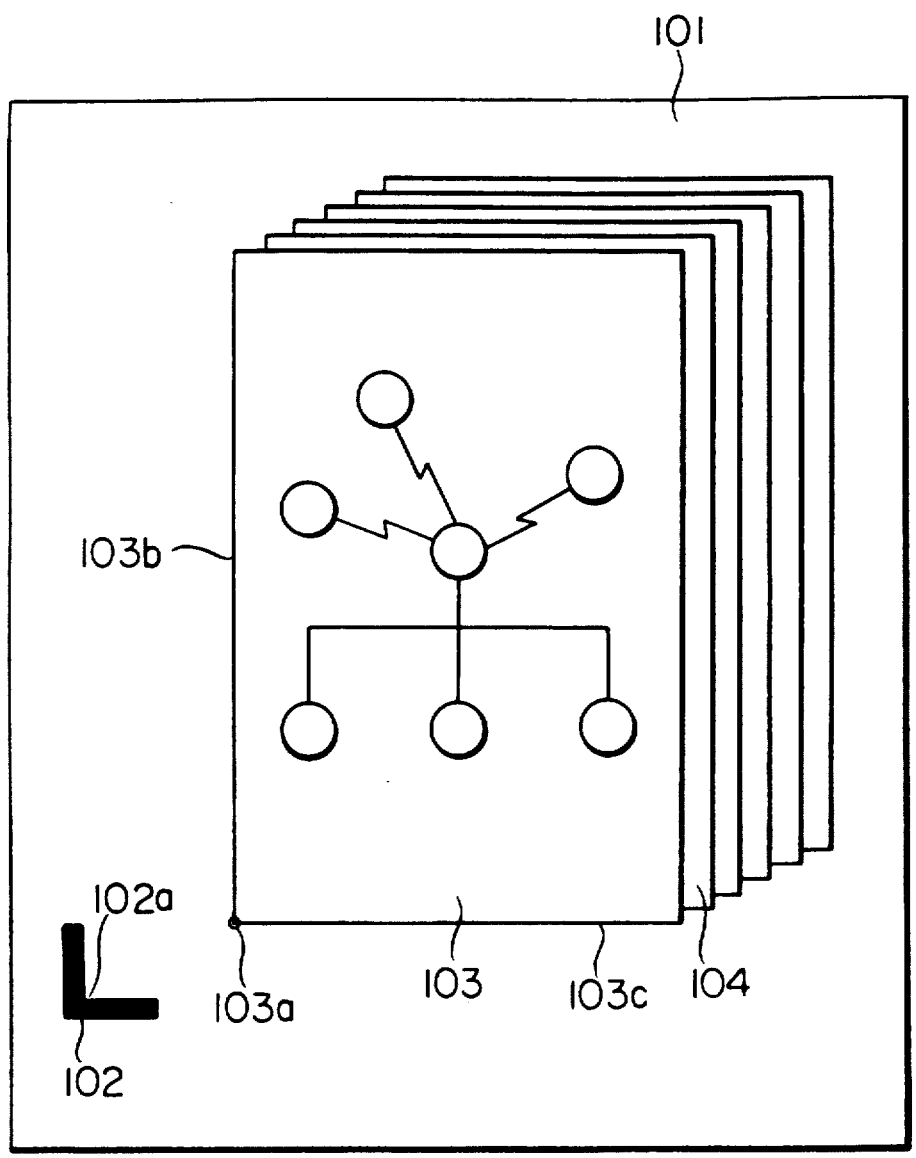
FIG. 1 is a schematic diagram illustrating a display diagram of the display mode ($\Delta x, \Delta y > 0$) according to the present invention.

Next, a description will be given of the forward page flipping 740 and the backward page flipping 750 of FIG. 15, which are the essential processing steps of the present invention. First, the forward page flipping 740 will be described with reference to FIGS. 1, 14, and 16. From the display mode selection unit 550, an instruction is issued to display the next page of the image being displayed on the image display apparatus and is delivered to the buffer management memory 590, the high-speed buffer memory 591, and the displayed image number memory 592. The buffer management memory 590 then outputs the page flipping image address 811 and the number of blocks of image data 813 of FIG. 16. Based on this information, the display location control unit 551 transfers the image of the page specified by the high-speed buffer memory 591 to a point of the image display apparatus according to the information from the displayed image number memory 592. At the same time, data to delete the vertical and horizontal lines 103b-103c of the previous page as shown in FIG. 1 is transferred from the image processor memory 530 to the image display apparatus, thereby displaying the image of the specified page on the image display apparatus.

Next, the backward page flipping of FIG. 15 described above will be described with reference to FIGS. 1, 14, and 16. From the display mode selection unit 550, an instruction is issued to display the previous page of the image being displayed on the image display apparatus and is delivered to the buffer management memory 590, the high-speed buffer memory 591, and the displayed image number memory 592. The buffer management memory 590 then outputs the page flipping image address 811 and the number of blocks of image data 813 of FIG. 16. Based on this information, the display location control unit 551 transfers the image of the page specified by the high-speed buffer memory 591 to a point of the image display apparatus according to the information from the displayed image number memory 592.

The image enlargement 760 of FIG. 15 will be described with reference to FIGS. 14-16. From the display mode selection unit 550, an instruction to enlarge the image displayed in the image display apparatus from the size of a quarter of the screen to the ordinary size or the full-screen size is outputted to the buffer management memory 590 and the displayed image number memory 592. The buffer management memory 590 then outputs the first block address of image data in optical disk 812 and the number of blocks of image data 813 of FIG. 16, which are sent to the image compression-expansion unit 520. Based on this data, the image compression-expansion unit 520 extracts the compressed image from the large storage unit 400, the image data is subjected to the expansion processing in the image compression-expansion unit 520 to restore the original image not compressed, and the resultant image is displayed on the image display apparatus. At the same time, the image data being displayed on the image displayed apparatus is transferred to the display frame memory 580. And also in the expansion processing, the forward page flipping 740 of the enlarged display, the backward page flipping 750 of the enlarged display, a reduced display for the displayed image enlargement 760, and the expanded image load 770 are configured in the same fashion as shown in FIG. 15, consequently, the page flipping is executed by the image display apparatus and the page flipping of the image of the quarter size is achieved by the display frame memory 580.

The expanded image load 770 of FIG. 15 will be described with respect to FIGS. 14, 15, and 17. From the display mode selection unit 550, an instruction to input a quarter image data is outputted to the buffer management memory 590, which in turn delivers the first block address of image data in optical disk 812 and the number of blocks of image data 813 of FIG. 16. The data is further transmitted to the image compression-expansion unit 520. Based on this data, the image compression-expansion unit 520 extracts the compressed image data from the large storage unit 400, the image data is subjected to the expansion processing in the image compression-expansion unit 520 to restore the image of the quarter size before the compression, and the resultant data is transferred as framed image data in the data sequence as shown in FIG. 17 to the high-speed buffer memory 591 in which the frame data has been stored in advance. At the same time, the next page image address of memory of FIG. 17 is transferred to the page flipping image address of FIG. 16 in the buffer management memory 590. Moreover, each time the image data is inputted to the high-speed buffer memory 591, the partial image of FIG. 1 is increased. When the image input processing is completed for all pages specified by the retrieval, the execution of this processing is finished.

Finally, the processing method as the other kernel of the present invention will be described with reference to FIG. 15. The forward page flipping 740, the backward page flipping 750, the displayed image enlargement 760, and the expanded image load 770 are configured to be executed in a concurrent fashion.

According to this embodiment, the processing to display pages in the either direction while inputting the external control information and the buffering processing of the high-speed buffer memory 591 to effect a high-speed page flipping can be concurrently executed, which enables the page flipping to be achieved at a higher speed.

Moreover, the method to display the black frame further simplifies the control of the document range for the high-speed page flipping, the direction of the page flipping, and the serial page number of a document currently being displayed.

As described above, according to the present invention, the page flipping can be visually controlled when searching for a desired image by visually checking each page of a great amount of images; which leads to an effect that even a beginner can achieve a correct retrieval at a high speed.

Furthermore, a description will be given of the second embodiment of the present invention.

Figures 18, 19:
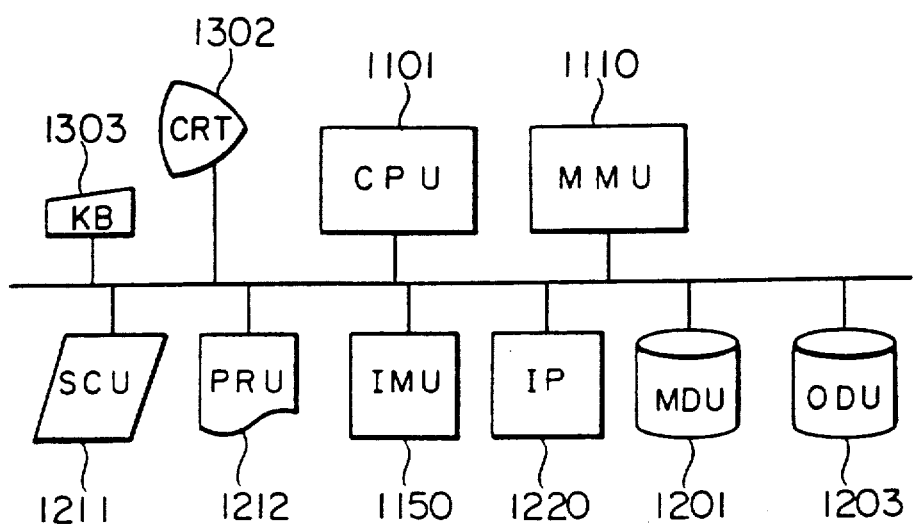
FIG. 18 is a schematic diagram showing the configuration of a system of the embodiment according to the present invention.
FIG. 19 is a schematic diagram illustrating the format of a table storing the document retrieval information.

FIG. 18 is a configuration diagram of a document filing system of an embodiment according to the apparatus of document browsing of the present invention. The overall functional flow of the system will be described with reference to FIG. 18. In this diagram, the system comprises a central processing unit (CPU) 1101, a main memory 1110, a document scanner 1211, a document printer 1212, an image memory 1150, an image processor (IP) 1220, a magnetic disk unit 1201, an optical disk unit 1203, a keyboard 1303, and a display 1302. The keyboard 1303 and the display 1302 are used to communicate with the user.

The document information includes a body and an index information such as bibliographic items of each document. In ordinary cases, the document body is supplied as an image of electronic data from the scanner 1211 and is stored on the optical disk 1203, whereas the retrieval information is inputted from the keyboard 1303 and is stored on the magnetic disk 1201 in a format suitable for the retrieval.

Figure 8:
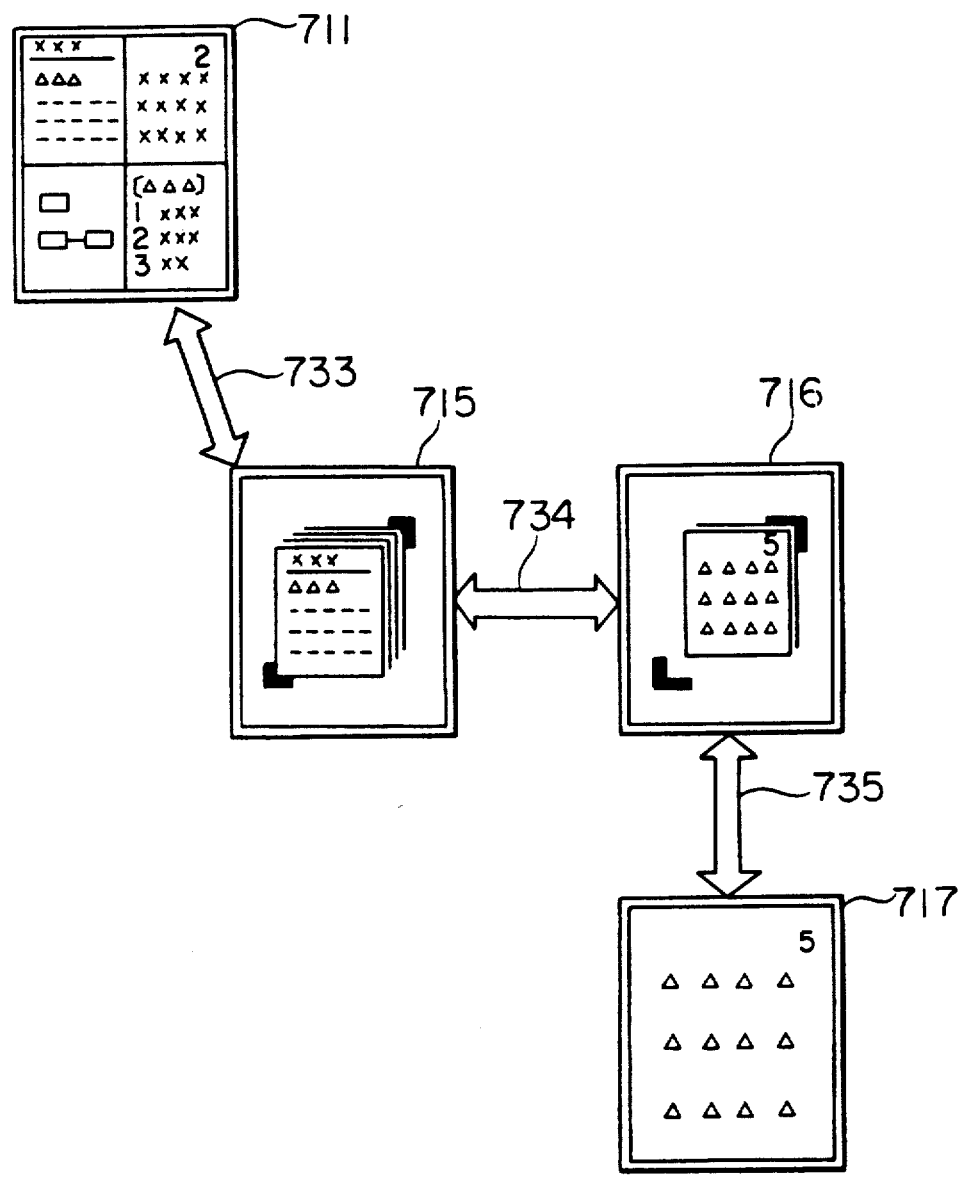
FIG. 8 is a schematic diagram depicting a display in a 3-dimensional manner and a high-speed page flipping operation.
Figure 10:
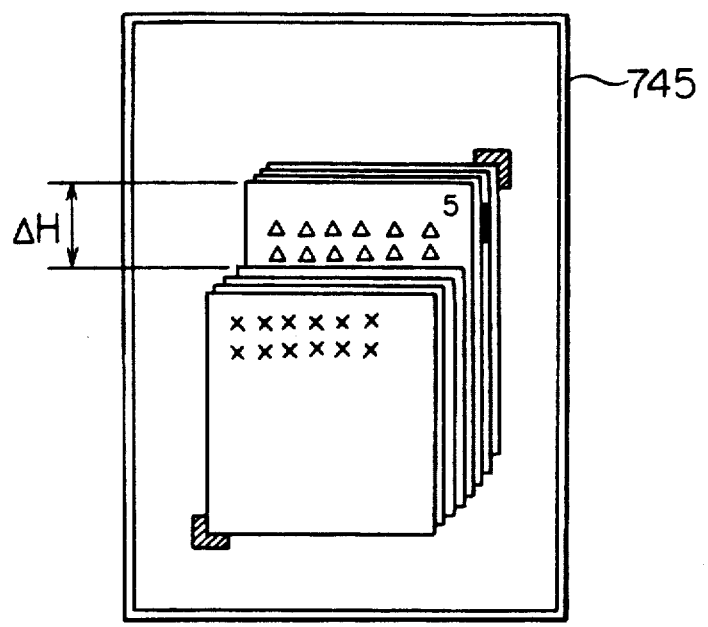
FIGS. 10–11 are diagrams schematically depicting the display contents to flip pages at a high speed.
Figure 11:
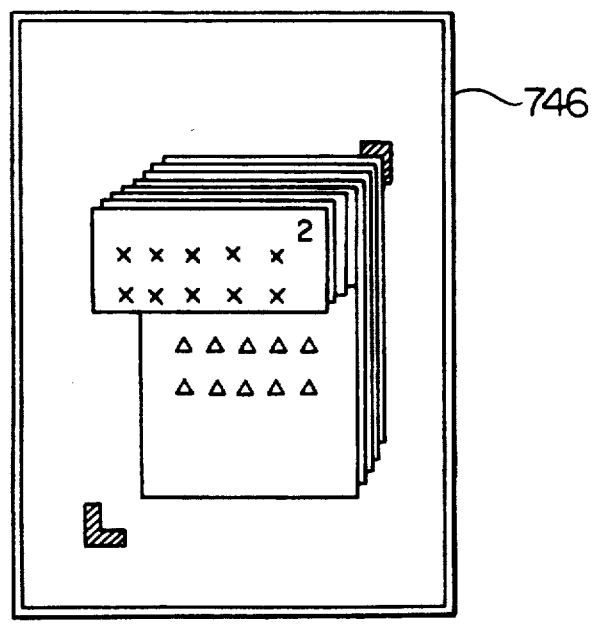

The document image is temporarily recorded in the image memory 1150 during the input processing. Although the scan density can be selected by the user, the document is usually scanned with a scan density of 16 lines/mm to guarantee a high-quality image. Consequently, the system reduces the document image size of the high resolution to ¼ of the original area to generate a document image of a resolution of 4 lines/mm, equivalently having the quarter size, in the image memory 1150. The reduction processing is achieved by the IP 1220. The optical disk 1203 is used to record both the high-resolution image and the reduced image. The former is used to print the image on a print sheet and to display an enlarged image on the display 1302, whereas the latter is used to obtain the display 710 and the display 715 of FIG. 8 and the display 745 of FIG. 10. The image to be recorded on the optical disk 1203 is subjected to redundancy suppression in the IP 1220 before the image is recorded.

A sequence of these processing is controlled by the CPU 1101 based on the programs loaded in the main memory 1110. Moreover, these processing programs are stored and managed on the magnetic disk 1201 and operates under control of a predetermined operating system.

Incidentally, since the present invention is characterized by the display mode in the retrieval operation, the processing of retrieval display will be described in detail.

FIG. 19 schematically shows a document table (DOC-TABLE) stored in the magnetic disk unit 1201 to record the retrieval information (managemental information of a document. The document table comprises a document ID (DID) field, a classification (CLASS) field, a TITLE field (for a title or a header), an AU field (for an author or a generator), a keyword (KW) field, and a DATE field (for a creation date). By referencing this table, the user can extract a set of document ID's including desired documents by use of a fragmental information concerning a title and a keyword. The user can visually confirm as an image on the display 1302 the set of the documents extracted as described later.

FIG. 20 schematically shows a page table (PAGE-TABLE) stored in the magnetic disk unit 1201 to manage the physical address of the image of each page on the optical disk 1203. The page table comprises a DID field, a page number (PN) field, a C field (indicating the high-resolution or reduced image), a PSYA field (for a physical address in the optical disk), an RL field (for the number of sectors indicating the record length), a scan density (SDEN) field, a SIZE field (for the size of a document image), and a CODE field (for a method of data compression). For example, in this diagram, the 1st page of the high-resolution image of the document number 2001 is stored in five sectors beginning from the physical address 28011 and is scanned with a scan density of 16 lines/mm in a size of a document of A4 (Japanese Standard: 210 × 297 mm). Furthermore, it is recorded in the page table that the redundancy compression is achieved in the modified read (MMR) method.

Consequently, it is basically possible to retrieve a document and to display the document body on the display 1302 if there exist the DOC-TABLE and the PAGE-TABLE.

Moreover, in the method of the present invention, a page attribute table of FIG. 21 is used. The page attribute table (ATTR-TABLE) comprises a DID field and eight fields A1-A8 indicating 8 kinds of page attributes, namely, nine fields are included. Although the page attribute is defined for each classification (CLASS) of a document, the classification can be effected, for example, in the specification of a patent application as A1 for "Claims", A2 for the text, A3 for the drawings, and A4 for the "Brief Description of the Drawings".

In the example of FIG. 21, for the document 2001, A1 and A2 are located beginning from the first and third pages, respectively. Moreover, it is indicated that A3 and A4 begin from the 15-th and 12-th pages, respectively.

Consequently, in order to display a plurality of pages of the document 2001 according to the logical structure of the document, the ATTRIBUTE-TABLE 403 is referenced to detect page numbers {1, 3, 15, 12} and the PAGE-TABLE 402 is referenced to detect the physical storage addresses of the respective pages. This enables to read the associated images from the optical disk unit 1203, to effect the compression restoration by use of the IP 1220, and to temporarily store the restored images in the image memory 1150. By combining the functions above, it is possible to imprement the display configurations of the document shown in FIGS. 7-11.

Next, a description will be given of means used to materialized a convenient display method easy to operate by organically combining these display configurations.

Figures 22, 23:
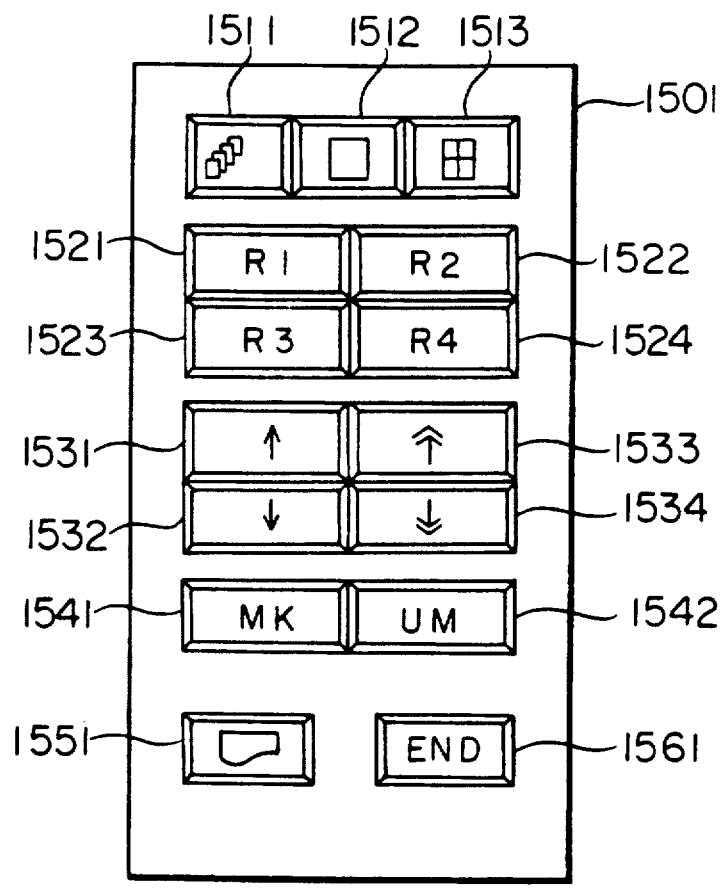
FIG. 22 is a schematic diagram illustrating a display mode table prescribing the display contents.
FIG. 23 is a schematic diagram showing a set of special keys used to input instructions of the user.

First, means to manage the current display state will be described. FIG. 22 is a schematic diagram showing registers to represent the display state. Actually, these registers are allocated in the main memory 1110. In FIG. 22, each symbol denotes a variable name (register name). The meanings of the respective registers will be described.

First, MODE represents a display mode. There exist three kinds of mode. Mode 0 is the high-speed page flipping mode associated with the displays 715-716 of FIG. 8, mode 1 is the enlarge mode associated with the display 717 of FIG. 8, and mode 2 is the simultaneous display mode related to the display 710 of FIG. 8.

Next, PAC is a page counter and indicates a virtual page number assigned to each page of the document as a result of the retrieval. The PAC is valid in the modes 0 and 1. The virtual page number here is a page number sequentially assigned to each page of documents beginning from the first document when a plurality of documents each having many pages are retrieved. Correspondences between the virtual page numbers and the pages of the documents are separately stored in a format of a table in the main memory 1110.

The next symbol, RGN standing for register denotes an area number of which the value ranges from 1 to 4. The RGN indicates an area to have been enlarged in the enlarge mode (FIG. 1). Consequently, this value is valid for MODE =1.

Registers R1-R4 correspond to the respective areas and are used to store information which indicates a page attribute of the page to be displayed. For example, R1='A1' means that the page attribute A1 is assigned to the area 1. The example described above indicate a case with R1='A1', R2='A2', R3='A3', and R4='A4'.

Next, registers R1P-R4P correspond to the respective areas like those described above and represent the current pages being displayed. Consequently, the virtual page numbers described above are retained. These values are valid for MODE =2.

Next, register NMK and MK (1) to MK (NMK) relate to the mark function in which NMK indicates the numbers of marked pages. The initial value of NMK is 0. When a mark is assigned, the pertinent virtual page number is recorded in the register MK (n) and 1 is added to the NMK at the same time. The register MK (1) to MK (NMK) are sorted such that the numeric values of the contents thereof are arranged in the ascending order.

Finally, register NRD and RD (1) to RD (NRD) are used to store the document count and the document ID's of the respective documents as a result of the retrieval. The virtual page numbers are assigned according to this information.

As described above, by storing the display state, the indication from the user and functions can be appropriately combined. FIG. 23 shows a key set dedicated to the browsing function for facilitating the indication and operation of the user. The key set is disposed in the keyboard 1303. Next, the meaning and operation associated with each key will be described in conjunction with the registers indicating the display state.

Figure 2:
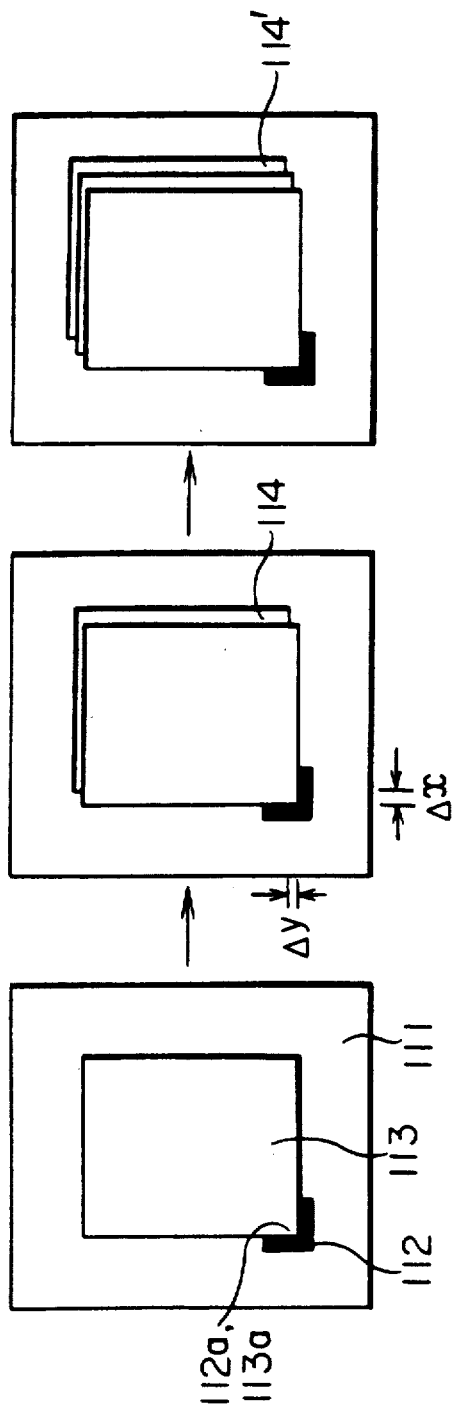
FIG. 2 is a schematic diagram showing the display contents while the page images are loaded to the high-speed buffer memory.
Figure 3:
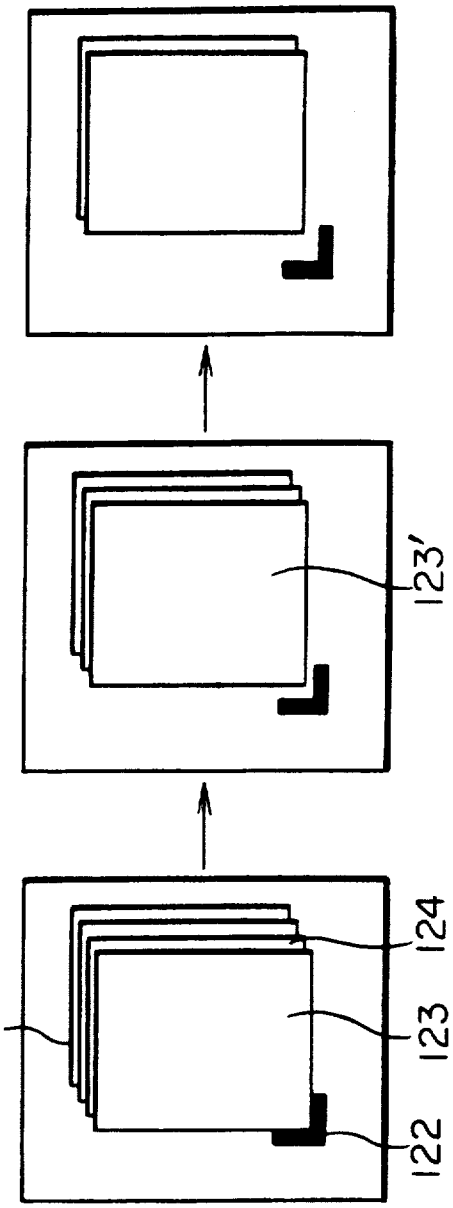
FIG. 3 is a schematic diagram depicting the display contents in a process to turn pages in the forward direction.
Figure 4:
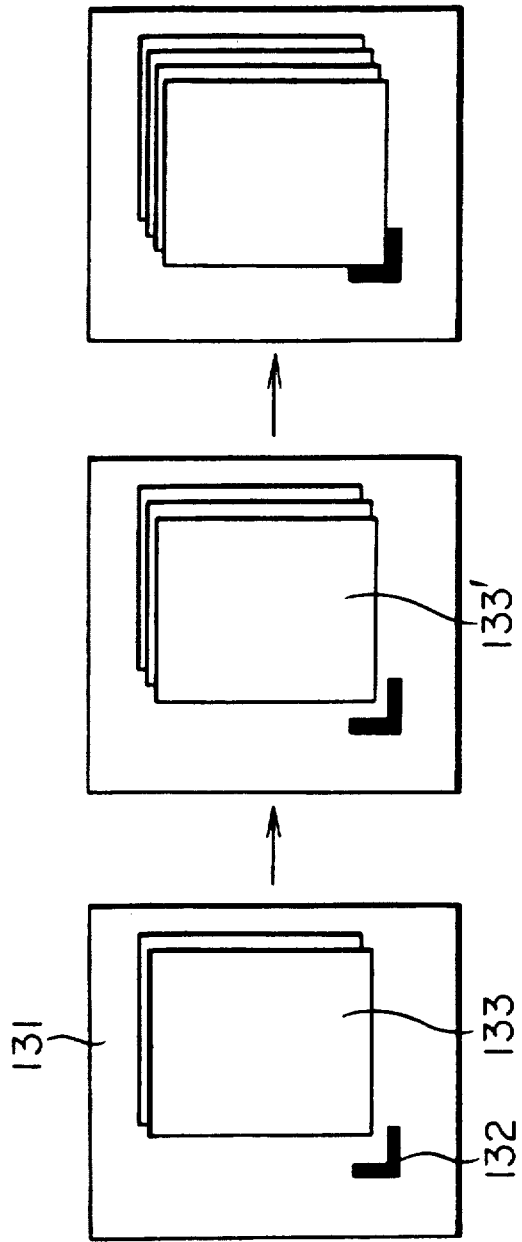
FIG. 4 is a schematic diagram depicting the display contents in a process to flip pages in the backward direction.
Figure 5:
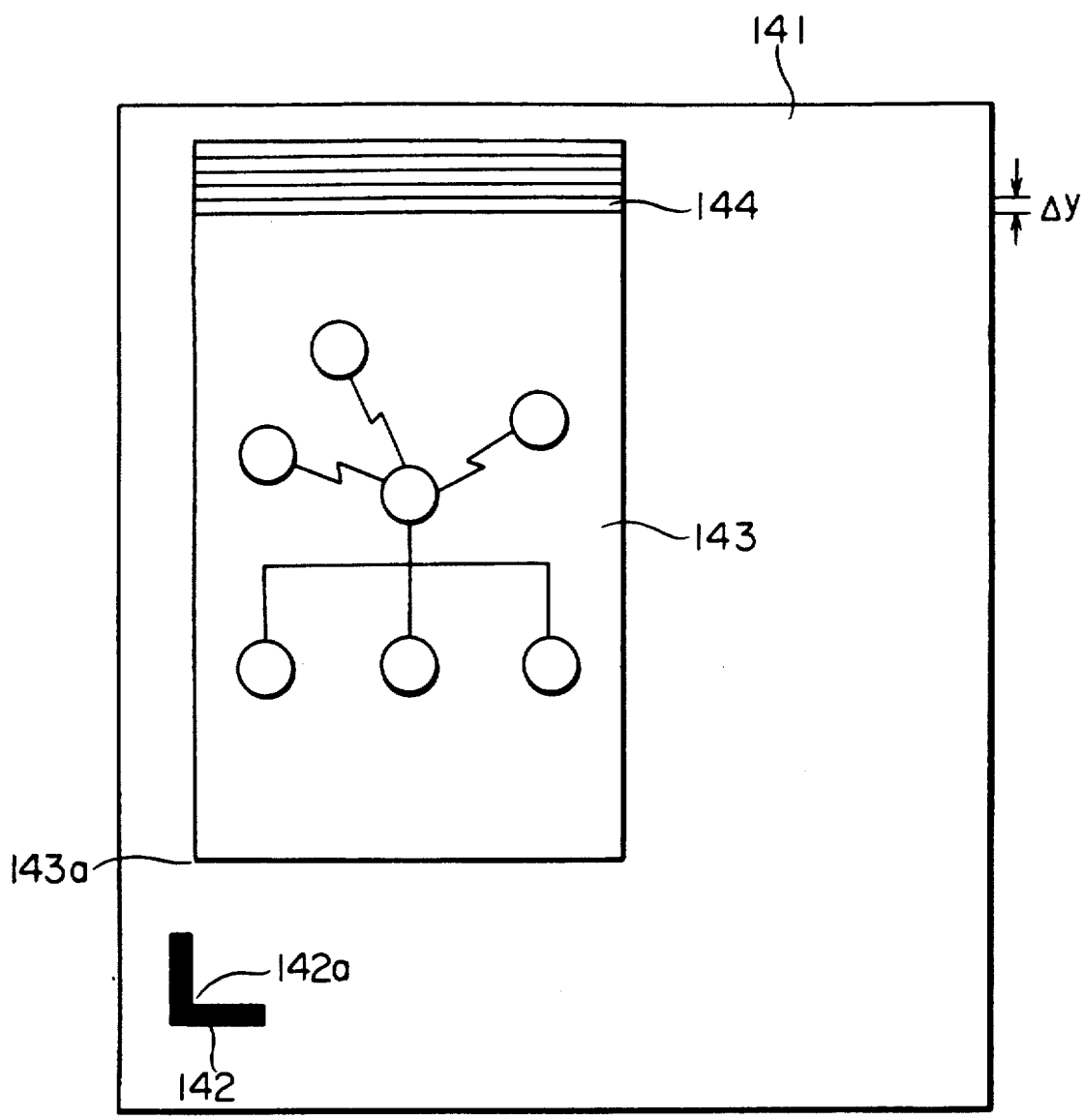
FIG. 5 is a schematic diagram showing the display mode when $\Delta x = 0$ and $\Delta y > 0$.
Figure 6:
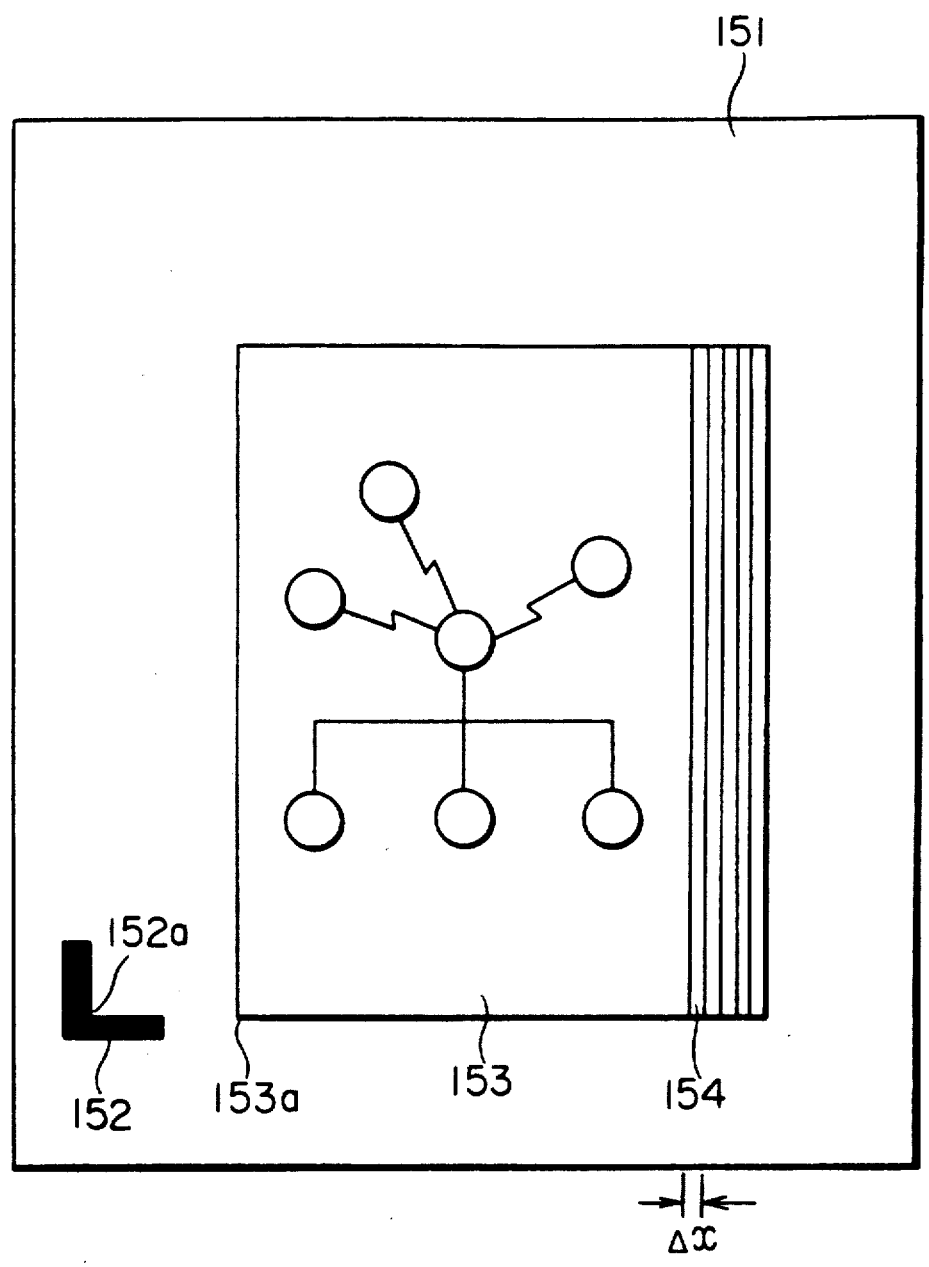
FIG. 6 is a schematic diagram illustrating the display mode when $\Delta x > 0$ and $\Delta y = 0$.
Figure 7:
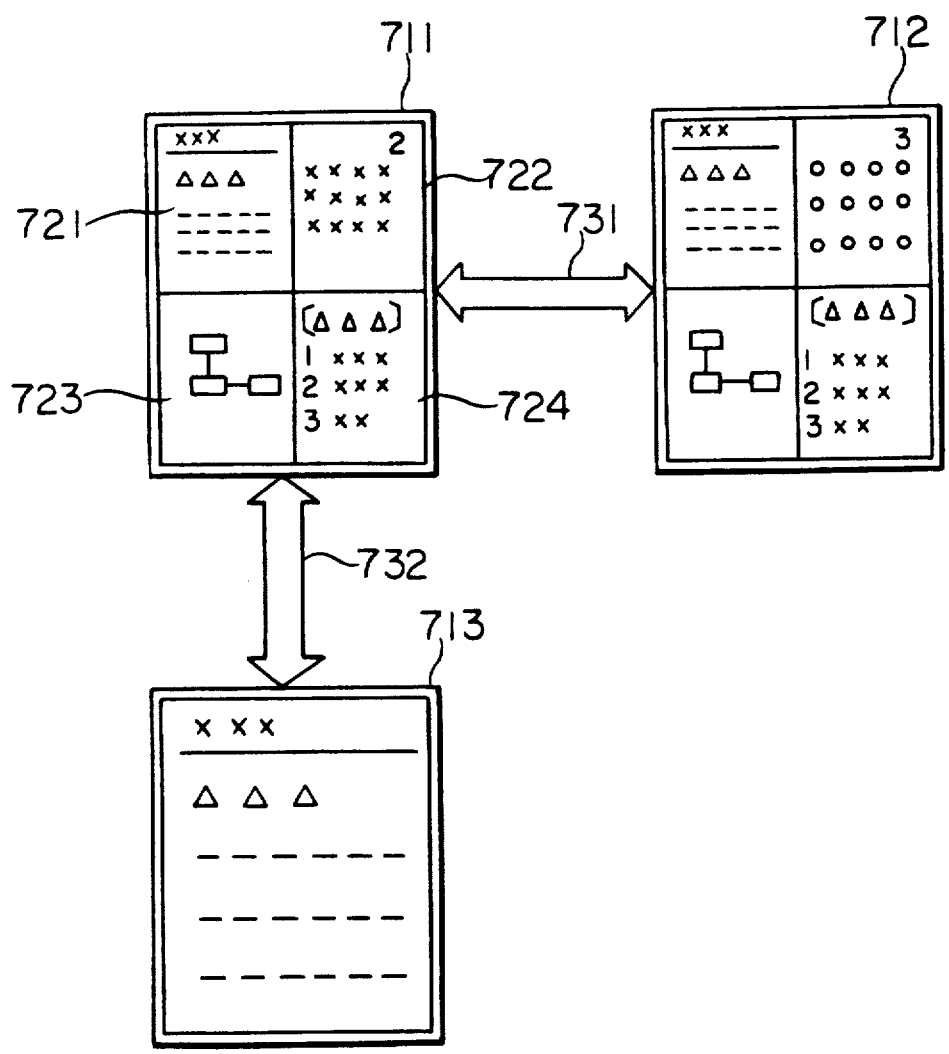
FIG. 7 is a schematic diagram showing a structural simultaneous display of a plurality of pages.

Three keys 1511–1513 are used to select display modes and correspond to the modes 0, 1, and 2, respectively. When the keys are pressed, the condition is sensed by the CPU and the value of the register MODE is accordingly rewritten in the main memory. Furthermore, the corresponding display is changed (FIGS. 1–2).

Four keys 1521–1524 specify a display area and are used in combination with another key. In the first combination, the keys are used with the key 1512 in the mode 2. For example, when the keys 1521 and 1512 are successively depressed, the area R1 is enlarged in the screen in which four pages are simultaneously displayed. Internally, the value of the register RGN is set to 1 in this operation In the second combination, the keys are used with the key 1531 or 1532 in the mode 2. For example, when the keys 1522 and 1531 are successively pushed in the mode 2, the value of the register RGN is set to 2, one is added to the value of the register R2P, and one page of the area R2 is flipped in the forward direction at the same time. If the key 1532 is pressed in place of the key 1531 in the operation above, the page is flipped in the backward direction.

As described above, the keys 1531 and 1532 are used to flip pages. In the mode 0 or 1, the value of the register is incremented or decremented by one, respectively. In the mode 2, the value of one of the registers R1P–R4P corresponding to the value of the register RGN is incremented or decremented by one.

Next, the keys 1533 and 1534 support the automatic page flipping function. When one of these keys is pressed in the mode 0 or 1, a high-speed page flipping operation is achieved up to a marked page. If the marked page is missing, namely, for NMK=0, the automatic page flipping operation is executed up to the first or last page of the document according to the specified flipping direction. Internally, the value of the associated register is up-dated. With one depression of the key, the page flipping operation is carried out from the current position to the next marked page. If the mark is missing in a location ahead of the current position, the page flipping operation is conducted up to the last (or first) page.

Figure 9:
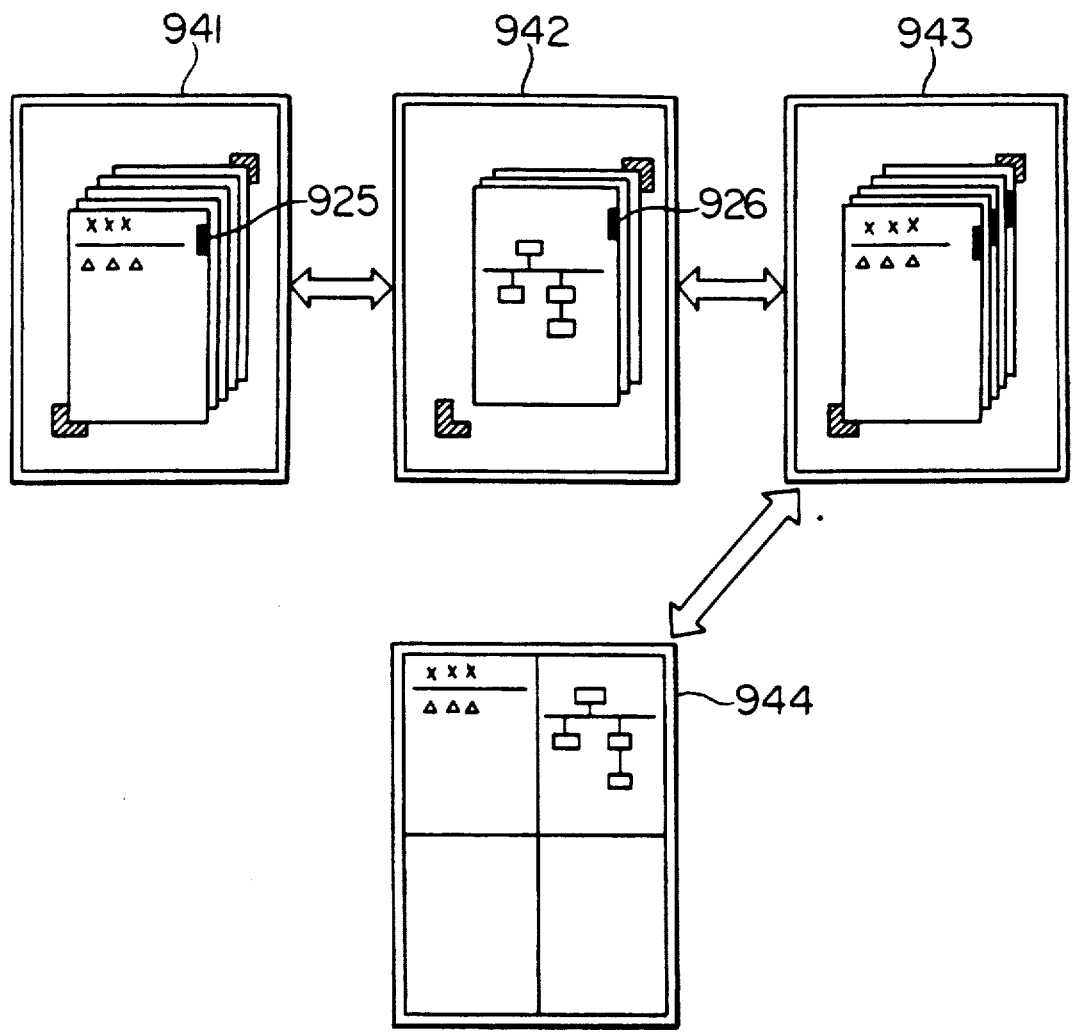
FIG. 9 is an explanatory diagram for explaining the mark function.

The keys 1541 and 1542 relate to the mark function and are effective in the modes 0 and 1. The page number of the page currently being specified, namely, the value of one of the registers R1P–R4P corresponding to the register PAC or RGN indicates the page number to be marked or to be released from the marked state. When the key 1541 is pressed a mark is added, the value of the NMK is incremented by one, and the virtual page number of the page to be marked is recorded in the register MK (NMK). Moreover, the MK (1) to MK (NMK) are sorted in the ascending sequence of the values thereof. Furthermore, in response to this operation, the rectangular marks 925 and 926 are graphically added to the current display image as shown in FIG. 9.

If the key 1542 is pressed, the system searches the registers MK (1) to MK (NMK) for the page number of the page currently being displayed. If the page number is found, the value is set to $+\infty$ (actually, 32767, for example) and the MK (1) to MK (NMK) are sorted in the ascending order of the values thereof. The value of the register NMK is then decremented by one. At the same time, the mark is deleted from the pertinent display. In addition, if the page number of the page currently being displayed is missing in the registers MK (1) to MK (NMK), namely, when the key 1542 is depressed at a location where the mark is not assigned, the system does not take any action.

On the other hand, the key 1551 is used to print all marked pages, whereas the key 1561 is provided to terminate the document display and to start the next retrieval operation.

In addition to the instructions from the user by use of the dedicated keys as described above, there are supported instructions to be supplied from the general keyboard. For example, a command ASGN is issued to specify the correspondences between the areas and the respective page attributes. For example, with the following four instructions,

ASGN R1 A1
ASGN R2 A2
ASGN R3 A3
ASGN R4 A3 the areas R1, R2, and R3–R4 can be corresponded to the "Claims", the text, and the drawings, respectively. In this case, however, as an exception handling, the initial page number of the R4 is assumed to be obtained by adding 1 to the initial page number of the R3. Moreover, when the keys 1523 and 1531 are pressed, the page flipping operation is performed in both areas of R3 and R4. This causes a page attribute to be assigned to a plurality of areas, thereby enabling an efficient usage of a wide screen area.

As described above, on receiving an instruction from the user by use of the keys of FIG. 23, the CPU 1101 updates the display state table (a set of registers) of FIG. 22 based on a predetermined program. Furthermore, based on a predetermined program, the CPU 1101 edits and combines in the image memory 1150 the document display images defined by the display state table and transfers the resultant images to the CRT 1302. The edit and combine processing of the images can be executed at a high speed by use of the IP 1220. Here, if the document image to be used for the edit and combine processing have not been loaded in the image memory 1150, the images are read from the optical disk unit 1203 and are subjected to the expansion processing in the IP 1220, and then the expanded images are written in the image memory 1150. To obtain the image as instantiated in FIG. 11 from the image of FIG. 7 through the edit and combine processing, the basic image processing steps such as a separation of a rectangular image, an image transfer, and the reduction and magnification of images need only be combined.

In the embodiment of the present invention above, the simultaneous display has been described to display four pages (areas) at the same time, the number of pages is not necessarily limited to four. Particularly, the completely same method may be applied to eight areas by increasing the number of displays to two.

In a case where the number of the displays is increased to two, it is possible to use functions in an organic combination, for example, one of the displays is set to the mode 0 or 2 and the other thereof is used in the mode 1; consequently, the method of the present invention becomes to be further effective.

In addition, although the embodiment of the present invention has been described in conjunction with an example of a document such as a specification of a patent application comprising a plurality of pages, the present invention is also efficiently applicable to the retrieval operation of single page documents such as articles of a newspaper. A function to enable the user to mark the desired pages while flipping the pages of the article obtained as a result of the retrieval operation and to print only the desired pages is an effective function which cannot be easily achieved with physical paper documents.

Furthermore, the function above can also be easily expanded to realize a function which prints all pages excepting the marked pages.

In addition, as a method to input an instruction from the user, an input from a special key set has been particularly considered; however, a method in which a mouse is use to specify an icon displayed in the screen is also applicable and is hence included in the method of the present invention.

Moreover, the description has been made of the embodiment in conjunction with a system including an optical disk unit in which the body of the retrieved document is extracted from the optical disk unit and is subjected to the image editing operation, and then the resultant image is displayed in the display screen; however, the method of the present invention can be similarly applied to a system connected to a local area network (LAN) in which the retrieval terminal (retrieval station) for the retrieval operation and the file server for storing the document data are separated.

According to the present invention as described above, since a plurality of documents obtained as a result of the retrieval can be arbitrarily displayed in the screen and the user can easily browse them, the truely relevent documents can be effectively efficiently identified, when compared with the retrieval of paper documents. Particularly, the simultaneous display function to display a plurality of pages in the same screen and the independent page flipping function for each page cannot be easily implemented when the retrieval is achieved on the paper documents, which enables the efficient relevance check.

In addition to the function to achieve a high-speed page flipping operation while displaying a plurality of pages in a 3-dimensional fashion, the functions to assign a mark at arbitrary pages and to automatically flip pages between the marked pages and the function to print only the marked pages are supported so as to effectively facilitate the operation of the filing system.

While the present invention has been described with reference to the particular illustrative embodiments, it is not restricted by those embodiments but only by the appended claims. It is to be appreciated that those skilled in the art can modify and change the embodiments without departing from the scope and spirit of the present invention.

What is claimed is:

1. An apparatus for displaying page images on a display screen, comprising;
    large capacity storage means for storing a plurality of document images and page attributes of said documents;
    high-speed buffer memory means for temporarily storing said document images having a plurality of pages and said page attributes;
    display frame memory means for storing a display frame image;
    means for displaying the display frame image in said display frame memory means on a display screen;
    image processing means for carrying out image processing on the document image data in said high-speed buffer memory means and storing the processed document image data in said high-speed buffer memory means or said display frame memory means as a display frame image;
    control means for controlling said display means and said image processing means such that an operation of accessing said large capacity storage means to read out document image data so as to transfer the data to said high-speed buffer memory means is carried out in parallel with said operation of image processing on other document image data in said high-speed buffer memory means and storing the processed document image data in said high-speed buffer memory means or said display frame memory means;
    control signal input means for receiving commands from a user;
    means for storing information which corresponds sections of the display frame image to the page attributes, said display frame memory means being divided into a plurality of sections; and
    said apparatus displaying sectioned images of said pages of said document images in accordance with said information stored in said means for storing information, each page having attributes corresponding to sections of said display frame memory means, said sectioned images of said pages being displayed on said display screen and said apparatus transforming said sectioned images of said pages into individual page images separated from each other in response to commands received by said control signal input means.

2. An apparatus for displaying according to claim 1 further comprising:
    a simultaneous display mode means for causing the simultaneous display of page images at a plurality of locations of a same document image, and for arbitrarily flipping the displayed page images in a forward or backward direction.

3. An apparatus for displaying page images according to claim 2 further comprising:
    means for editing and combining a plurality of pages of document images to generate an image in a 3-dimensional form wherein a transition between a 3-dimensional display mode and a simultaneous display mode is enabled.

4. An apparatus for displaying page images according to claim 1 further comprising:

means for assigning a mark to a document image being displayed and for deleting the mark.

5. An apparatus for displaying page images according to claim 4 further comprising:
means for effecting, in response to a single instruction, a page flipping operation from a page image being displayed to a marked page.

6. An apparatus for displaying page images according to claim 5 further comprising:
means for indicating whether the page flipping operation is effected in the forward or backward direction.

7. An apparatus for displaying page images according to claim 4 further comprising:
means for printing a page image of only the marked page.

8. An apparatus for displaying page images according to claim 4 further comprising:
means for printing page images of pages other than the marked page.

9. An apparatus according to claim 1, wherein said large capacity storage means stores the document images in both an original size and a reduced size corresponding to the size of the sections.

10. An apparatus for displaying page images on a display screen, comprising:
large storage means for storing a large amount of page images;
image memory for temporarily storing a plurality of page images from said large storage means;
information memory means for storing information related to said page images to be read out from said large storage means;
display means for displaying page images from said image memory means on a display screen in a specific display manner, said specific display manner being a format representative of pages of a book;
display mode selection means for selecting a display mode which causes page images to be displayed on said display screen, said selected display mode causing said page images to be sequentially flipped in a forward or reverse direction;
image processing means for carrying out data processing on the page images read out form said large storage means in accordance with said display mode selected by said display mode selection means; and
control means for controlling said display means and said image processing means in such a manner that when a display mode is selected by said display mode selection means, an operation of processing page images read out from said large storage means in accordance with said information in said information memory means and transferring the processed page images to said image memory means, is carried out in parallel with an operation of reading out other page images stored by said image memory and displaying the page images on said display screen.

11. An apparatus for displaying page images according to claim 10 wherein a start point mark, indicating a display point of a page image first read from the large storage means, is displayed in a portion of the display screen of the display means.

12. An apparatus for displaying page images according to claim 10 wherein the page images displayed on the display screen are of the same size and display positions thereof in the display screen are obtained by shifting the page images in parallel by fixed distances in the vertical and horizontal directions.

* * * * *